United States Patent

[11] 3,558,045

[72] Inventors Dexter E. Smith;
 Elmer C. Miller, Bartlesville, Okla.
[21] Appl. No. 715,407
[22] Filed Mar. 22, 1968
 Substitute for application Ser. No. 618,069,
 Feb. 23, 1967, now abandoned.
[45] Patented Jan. 26, 1971
[73] Assignee Phillips Petroleum Company
 a corporation of Delaware

[54] CONTROL SYSTEM FOR CHEMICAL REACTIONS
 10 Claims, 2 Drawing Figs.
[52] U.S. Cl. .......................................................235/151.12,
 260/94.9, 235/150.1
[51] Int. Cl. .......................................................G05b 17/00,
 C08d 3/04
[50] Field of Search ............................................235/151.12;
 260/94.2, M; 260/94.9M, P

[56] References Cited
UNITED STATES PATENTS
3,020,490 2/1962 Kleiss ...........................235/151.12(X)
3,130,187 4/1964 Tolin et al. ....................235/151.12(X)
3,257,363 6/1966 Miller et al. ................... 260/88.2
3,321,280 5/1967 Trotter, Jr. et al. ............235/151.12(X)

Primary Examiner—Eugene G. Botz
Attorney—Young and Quigg

ABSTRACT: A chemical conversion process is controlled by calculating the concentration of a reactant within the reactor, such as by means of heat balance computations. The actual concentration of this reactant in the reactor effluent, or in the reactor, is measured by an analyzer. The calculated concentration and the measured concentration are compared, and the resulting signal is employed to control a reaction variable, such as feed rate of a reactant.

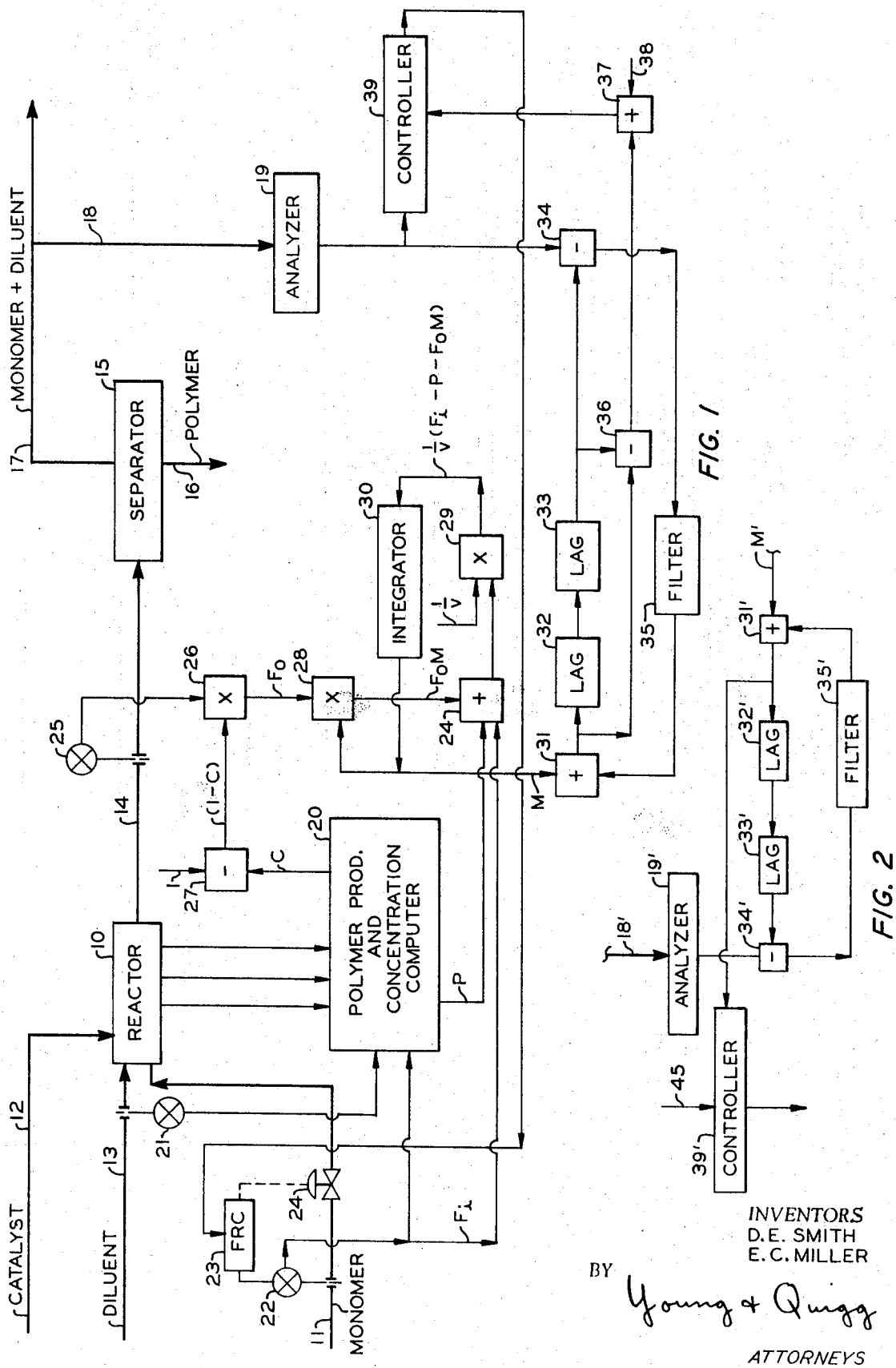

CONTROL SYSTEM FOR CHEMICAL REACTIONS

This application is a continuation-in-part of application Ser. No. 618,069, filed Feb. 23, 1967, now abandoned.

In various chemical processes it is desirable to maintain the concentration of reactants constant in order to assure uniform rates of reaction and the production of desired products. For example, a process for polymerizing olefins to form solid polymer is disclosed in Belgian Pat. 591,527. When such a polymerization process is operated for maximum throughput, the concentration of monomer within the reactor is relatively small compared the input of monomer to the reactor. If the monomer concentration within the reactor should decrease due to some process upset, a solubilizing of the polymer in the diluent can result in deposition of polymer on the reactor walls. If the monomer concentration should increase, a discharge of the polymer from the bottom portion of the reactor can cause the formation of gas bubbles with the resultant formation of polymer on the reactor walls. Such formation of polymer can reduce the heat transfer properties of the reactor and may cause plugging. Thus, it is desirable to maintain the monomer concentration at a constant value within the reactor.

Many types of automatic control systems for chemical processes have been disclosed in the prior art. For the most part, these systems utilize an analysis of a product stream to control a process variable. However, this often introduces a delay factor between any process change and the subsequent analysis and control based on this change. In U.S. Pat. No. 3,257,363 there is disclosed a control system for a polymerization process wherein the concentration of polymer in the reaction mixture is calculated from a measurement of the density of the reaction materials and an analysis of the reactor effluent. This concentration signal is employed to control the polymerization system. U.S. Pat. No. 3,175,764 discloses a control system which utilizes apparatus to compensate for lags between changing process conditions and a point of measurement, and U.S. Pat. No. 2,932,471 discloses a control system which employs a computer in the control loop.

Most of the prior art control systems have a common element of measuring a process condition to be controlled and making calculations based on this measured condition. While these systems are effective in many operations, there is usually a delay involved between a action change and the time of making the measurement and taking the control step. This delay can cause serious operating problems and may cause a reactor to be shut down in some circumstances. While conventional lagging elements serve to minimize this problem in some situations, they can not compensate for sudden unexpected fluctuations.

In accordance with the present invention, a chemical reaction is controlled by calculating the concentration of one of the reactants within the reaction zone and comparing this calculation with an actual analysis of the concentration of such reactant in the reactor effluent or in the reactor itself. The calculated concentration can be made by heat balance computations of the type described in U.S. Pat. No. 2,974,017. The computer described in this Pat. provides an output signal which is representative of the concentration of polymer in a polymerization zone. In accordance with the present invention, a signal representing the concentration of monomer within the polymerization zone is computed from the polymer concentration signal. An analyzer is employed to measure the actual concentration of monomer. These two signals are then compared to provide a final control signal which adjusts a suitable operating condition of the reaction, such as the flow of monomer to the reaction zone.

Accordingly, it is an object of this invention to provide an improved system for controlling chemical reactions.

Another object is to provide a system for controlling a polymerization reaction by computing the concentration of monomer within the reactor and comparing this computed value with a measurement of the actual monomer concentration in the reactor effluent or in the reactor.

A further object is to provide a system for calculating the concentration of monomer in a polymerization zone.

Other objects, advantages and features of the invention should become apparent from the following detailed description, taken in conjunction with the accompanying drawing in which:

FIG. 1 is a schematic representation of a first embodiment of the control system of this invention. FIG. 2 is a schematic representation of a second embodiment of a portion of the control system.

Referring now to the drawing in detail and to FIG. 1 in particular, there is shown a reactor 10 in which is conducted a polymerization reaction. This reactor can be a stirred reactor of the type shown in U.S. Pat. No. 2,974,017 or a loop reactor of the type shown in U.S. Pat. No. 3,356,667, for example. A stream of monomer to be polymerized is introduced into reactor 10 through a conduit 11, and a catalyst is introduced through a conduit 12. A diluent or solvent is introduced through a conduit 13. The reactor effluent is removed through a conduit 14 which communicates with a suitable separation system 15. Polymer is removed through a conduit 16, and a stream comprising unreacted monomer and diluent is removed through a conduit 17. A conduit 18 introduces a sample of the monomer and diluent stream into an analyzer 19 which measures the concentration of monomer. Analyzer 19 can be a chromatographic analyzer, for example.

In accordance with this invention, the concentration of monomer within reactor 10 is regulated in response to a computation of the concentration of monomer within the reactor and a measurement of monomer concentration. To this end, a polymer production and concentration computer 20 is employed. This computer can be of the type disclosed in U.S. Pat. No. 2,974,017. As described in this patent, a heat balance is computed from measurements of the various sources of heat gain and loss in the reactor. If a loop reactor of the type described in U.S. Pat. No. 3,356,667 is employed, the computer can be simplified by the elimination of certain of the equations described in U.S. Pat. No. 2,974,017, such as equations (3) and (5). One of the input signals to computer 20 is the rate of flow of diluent through conduit 13. A flow transmitter 21 is connected to this conduit to transmit a rate of flow signal to the computer. A second input signal is the rate of flow of monomer through conduit 11. This signal is established by a flow transducer 22 which is connected to conduit 11. Flow transducer 22 also sends a signal to a flow controller 23 which adjusts a valve 24 to regulate the flow of monomer through conduit 11. The set point of controller 23 is adjusted in accordance with this invention in the manner to be described. Computer 20 provides a first output signal which is applied to the first input of a signal summing device 24. This output signal from computer 20 represents the polymer production rate P within the reactor, and corresponds to signal P of FIG. 10 of U.S. Pat. No. 2,974,017. This signal can either be electrical or pneumatic depending on the nature of the individual elements employed in the computer and control system of this invention.

The second input signal to summing device 24 is the rate of flow of monomer through conduit 11, which is measured by transducer 22. The third input signal to summing device 24 is representative of the rate of flow of monomer in the effluent stream from reactor 10. This signal is computed from a polymer concentration signal C (see FIG. 10 of U.S. Pat. No. 2,974,017) from computer 20 and the rate of flow of the entire effluent stream 14 from reactor 10. A flow transducer 25 establishes a signal which is representative of the total rate of flow of material through conduit 14. This signal is applied to the first input of a signal multiplier 26. The output signal C from computer 20 is applied to the first input of a subtractor 27. The second input to the subtractor is a reference signal which is numerically equal to unity so that the output of the subtractor is equal to the quantity 1–C. This signal is applied as the second input to multiplier 26. The output product signal from multiplier 26 is applied to the first input of a second signal multiplier 28. The output signal of multiplier 28 is applied to the third input of summing device 24.

Summing device 24 is arranged to subtract the output signal P from computer 20 from the signal from flow transducer 22 and to subtract therefrom the output signal from multiplier 28. The resulting output signal from summing device 24 is applied to the first input of a signal multiplier 29. The second input to this multiplier is a reference signal representative of the quantity 1/V. The output signal from multiplier 29 is applied to the input of an integrator 30, the output of which is applied as the second input to signal multiplier 28. The output signal from integrator 30 is also applied to the first input of a signal summing device 31. The apparatus thus far described solves the general equation $$\frac{dM}{dt} = \frac{1}{V}(F_i - P - F_oM)$$

where M is the monomer concentration in the reactor, $t$ is time, V is the volume of the reactor, P is polymer production rate, $F_i$ is the rate of flow of monomer into the reactor, and $F_oM$ is the rate of flow of monomer out of the reactor. Thus, the first input to summing device 31 is a signal M which is representative of the concentration of monomer within reactor 10.

The output signal from summing device 31 is applied through two lagging means 32 and 33 to the first input of a signal subtractor 34. The second input to subtractor 34 is the output signal from analyzer 19. The output signal from lagging means 33 is subtracted from the analyzer output signal, and the difference is applied through a filter network 35 to the second input of summing device 31. In this manner, the computed value of monomer concentration within the reactor is compared with the actual measured monomer concentration in the reactor effluent, and the difference, if any, is added to the computed value by summing device 31. As will be described hereinafter in greater detail, lagging means 32 and 33 are employed to compensate for the time lag which results from the flow of monomer through the separation system and the time lag in analyzer 19, respectively. Filter 35 is merely a smoothing device to minimize minor fluctuations.

The output signals from summing device 31 and lagging means 33 are applied as respective input signals to a signal subtractor 36. The resulting output signal, which represents the difference between these two input signals, is applied to a signal summing device 37. A set point signal 38, representative of the desired monomer concentration in reactor 10, constitutes the second input to summing device 37. The output signal from summing device 37 is applied as the set point to a controller 39. The output signal from analyzer 19 constitutes the input signal to the controller. The output signal from controller 39 is employed as the set point signal to flow controller 23 in order to regulate the flow of monomer into reactor 10.

Lagging means 32 and 33 can be any type of devices which are capable of solving the following typical equations:

$$Y_1 = \frac{K_1}{S_1(\tau_1 S + 1)(\tau_2 S + 1)}(X) \quad (1)$$

$$Y_2 = \frac{K_2}{S_2(\tau_3 S + 1)(\tau_4 S + 1)}(Y_1) \quad (2)$$

where $Y_1$ is the LaPlace transform of the output signal from means 32, X is the LaPlace transform of the input signal to means 32, $Y_2$ is the LaPlace transform of the output signal from means 33, and $K_1$ and $K_2$ are constants. $\tau_1$ and $\tau_2$ are time constants corresponding to actual time lag and time constant of the processing equipment between reactor 10 and analyzer 19. $\tau_3$ and $\tau_4$ are time constants corresponding to analyzer 19. $S_1$ represents pure dead time in the processing equipment, and $S_2$ represents pure dead time in analyzer 19. S is the LaPlace operator. For further details as to the derivation and automatic control theory for the aforementioned equations, reference is made to "Principles of Feedback Control" by Charles Wilts, Addison-Wesley 10, 1960. These lag means can be conventional analogue or digital computing devices which are compatible with the other elements of the computing equipment.

Whereas the above description of this invention has been made with respect to sampling the effluent stream from the reactor and analyzing such stream to determine the monomer concentration, it is within the scope of the invention to analyze a sample of the reaction mixture itself. In this situation, a sample of material withdrawn from reactor 10 is passed directly to analyzer 19. This results in the elimination of lagging device 32 or a modification of this device in accordance with any process lag between the sample point and the analyzer.

Under steady state operating conditions, the computed concentration of monomer in reactor 10 is equal to the monomer concentration detected by analyzer 19 when proper calibration factors are employed. As such, the two signals to subtractor 34 are the same. Similarly, the two signals to subtractor 36 are the same, with the result that there is no error signal added to the set point signal in summing device 37. As such, controller 39 compares set point signal 38 with the output of analyzer 19 and controls valve 24 in accordance therewith. If the reactor should be upset, such as by the introduction of a catalyst poison into the reactor, the polymer production rate will decrease and the monomer concentration within the reactor will increase. The net result is that the signal M to summing device 31 will increase, and this in turn will increase the magnitude of the output signal from device 31. Since the signal transmitted through lagging devices 32 and 33 is delayed, there will be an output signal from subtractor 36 applied to summing device 37. This serves to modify the set point to controller 39 to decrease the flow of monomer into the reactor. The foregoing correction occurs before a change in monomer concentration is detected by analyzer 19. The prompt correction of monomer feed rate to compensate for the catalyst poison thus tends to maintain a steady monomer concentration. If proper corrective action is taken promptly, the change eventually sensed by analyzer 19 will be a minimum. Conversely, a decrease in monomer concentration will result in the control system operating in opposite manner. When steady state conditions are once again obtained, the two signals applied to subtractor 36 will again be the same.

A modified form of the control system of this invention is illustrated schematically in FIG. 2 wherein elements corresponding to those illustrated in FIG. 1 have like primed reference numerals. In the system of FIG. 2, the output signal from summing device 31' is applied directly as the input signal to controller 39'. A set point signal 45, corresponding to set point signal 38 of FIG. 1, is also applied to the controller. The output of controller 39' adjusts the set point of controller 23 in FIG. 1. In the system of FIG. 2, subtractor 36 and summing device 37 are eliminated, and the output signal from analyzer 19' is no longer applied directly to controller 39'. Otherwise, the control system is the same as that described in FIG. 1. In the system of FIG. 2, the flow of monomer is controlled directly from the computed monomer concentration within the reactor. However, this signal, after being lagged by devices 32' and 33', is compared with the analyzer output by subtractor 34', and any difference therebetween is fed back through filter 35' to modify the computed monomer signal.

It should be evident that the various elements of the control systems of this invention can be electrical or pneumatic devices known in the art. The computations can be made by an analogue computer of the type illustrated, or by means of a digital computer.

While this invention has been described in conjunction with presently preferred embodiments, it should be evident that it is not limited thereto.

We claim:
1. A method of controlling a process in which a chemical reaction takes place in a reaction zone, comprising the steps of calculating the concentration of a reactant within the reaction zone from measurements of process variables other than the concentration of said reactant within said zone, measuring the concentration of said reactant in the process, comparing the calculated concentration with the measured concentration, and controlling the amount of said reactant passed to said reaction zone in response to the compared concentrations.

2. The method of claim 1 wherein the calculated concentration of reactant is delayed before being compared with the measured concentration, the duration of such delay being equal to the timelag in the process and obtaining the measured concentration.

3. The method of claim 1 wherein a first signal is established which is representative of said calculated concentration and a second signal is established which is representative of said measured concentration, a third signal obtained in the manner to be described hereinafter is delayed to establish a fourth signal, said fourth signal is compared with said second signal to establish a fifth signal representative of the difference therebetween, said fifth signal is added to said first signal to establish said third signal, said fourth signal is compared with said third signal to establish a sixth signal representative of the difference therebetween, and said sixth signal is compared with said second signal to establish a seventh signal representative of the difference therebetween, the amount of reactant passed to said reaction zone being controlled in response to said seventh signal.

4. The method of claim 1 wherein a first signal is established which is representative of said calculated concentration and a second signal is established which is representative of said measured concentration, a third signal obtained in the manner to be described is delayed to establish a fourth signal, said fourth signal is compared with said second signal to establish a fifth signal representative of the difference therebetween, said fifth signal is added to said first signal to establish said third signal, and said third signal is compared with a set point signal, the amount of reactant passed to said reaction zone being controlled in response to the comparison of said third signal with said set point signal.

5. The method of claim 1 wherein said reaction is exothermic and wherein the concentration of reactant is computed from measurements of the heat generated in said reaction zone.

6. The method of claim 5 wherein the reaction is a polymerization reaction and the reactant is monomer.

7. In a system which includes a reactor, inlet means communicating with said reactor to introduce a reactant, and outlet means communicating with said reactor to withdraw product; control apparatus comprising computing means connected to said system to calculate the concentration of reactant in said reactor and to establish a first signal representative thereof, said computing means measuring variables in the system other than the actual reactant concentration; analyzing means connected to said system to measure the concentration of reactant in the system and to establish a second signal representative thereof; lag means; means to pass said first signal through said lag means to establish a third signal; means to compare said second and third signals; and means responsive to said means to compare to control the introduction of reactant into said reactor.

8. The apparatus of claim 7 wherein said means to pass, said means to compare and said means to control comprise a first signal summing means, means applying said first signal to the first input of said first summing means, first signal subtracting means, means applying said second signal to the first input of said first subtracting means, means applying the output of said first adding means through said lag means to the second input of said first subtracting means, means applying the output of said first subtracting means to the second input of said first adding means, second signal subtracting means, means applying the output of said lag means to the first input of said second subtracting means, means applying the output of said first adding means to the second input of said second subtracting means, second signal adding means, means applying the output of said second subtracting means to the first input of said second adding means, means applying a reference set point signal to the second input of said second adding means, a controller, means applying said second signal to the input of said controller, means applying the output of said second adding means to the set point of said controller, and means responsive to the output of said controller to regulate the flow of reactant into said reactor.

9. The apparatus of claim 7 wherein said means to pass, said means to compare and said means to control comprise a signal summing means, means applying said first signal to the first input of said summing means, signal subtracting means, means applying said second signal to the first input of said subtracting means means applying the output of said adding means through said lag means to the second input of said subtracting means, means applying the output of said subtracting means to the second input of said adding means, a controller, means applying a reference set point signal to said controller, and means responsive to the output of said controller to regulate the flow of reactant into said reactor.

10. The apparatus of claim 7 wherein said computing means comprises a heat balance computer connected to said system to provide a fourth signal representative of the concentration of reactant in said reactor and a fifth signal representative of the rate of production of product within said reactor, signal summing means, means applying said fifth signal to the input of said signal summing means, means applying a signal representative of the rate of flow of reactant into said reactor to said signal summing means, a first signal multiplier, means to apply a signal representative of the rate of product withdrawal from said reactor to the first input of said first multiplier, a signal subtractor, means to apply said fourth signal to the first input of said signal subtractor, means to apply the output of said signal subtractor to the second input of said first multiplier, a second signal multiplier, means to apply the output of said first multiplier to the first input of said second multiplier, a third signal multiplier, means to apply the output of said second signal multiplier to the input of said signal summing means, means to apply the output of said signal summing means to the first input of said third multiplier, means to apply a reference signal to the second input of said third multiplier, a signal integrator, means to apply the output of said third multiplier to the input of said integrator, and means to apply the output of said integrator to the second input of said second multiplier, the output of said integrator being said first signal.

UNITED STATES PATENT OFFICE

CERTIFICATE OF CORRECTION

Patent No. 3,558,045   Dexter E. Smith; Elmer C. Miller   Dated: January 26,

It is certified that error appears in the above-identified patent and th Letters Patent are hereby corrected as shown below:

Column 6, line 28, a comma should be added after "means", first occurrer line 31, "means applying the output of said adding means to th input of said controller," should be added after "cor line 47, "means to apply a reference signal to the second inpu said signal subtractor," should be added after "subtractor," .

Signed and sealed this 24th day of August 1971.

(SEAL)
Attest:

EDWARD M. FLETCHER, JR.
Attesting Officer

WILLIAM E. SCHUYLER, JR.
Commissioner of Patents